(12) United States Patent
Eberling et al.

(10) Patent No.: US 7,117,896 B2
(45) Date of Patent: Oct. 10, 2006

(54) AIR SYSTEM MODULE INCLUDING RESERVOIR AND MOUNTING STRUCTURE

(75) Inventors: Charles E. Eberling, Wellington, OH (US); Curtis Samuel Snyder, Elyria, OH (US); Gregory R. Ashley, Amherst, OH (US); Fred W. Hoffman, Columbia Station, OH (US)

(73) Assignee: Bendix Commercial Vehicle System LLC, Elyria, OH (US)

( * ) Notice: Subject to any disclaimer, the term of this patent is extended or adjusted under 35 U.S.C. 154(b) by 0 days.

(21) Appl. No.: 10/637,150

(22) Filed: Aug. 8, 2003

(65) Prior Publication Data

US 2005/0168058 A1 Aug. 4, 2005

(51) Int. Cl.
*A01G 25/09* (2006.01)

(52) U.S. Cl. .................. 137/899; 137/574; 137/899.4; 220/563; 280/781

(58) Field of Classification Search ............... 137/899, 137/899.4, 574; 220/563, DIG. 26, DIG. 27; 280/781
See application file for complete search history.

(56) References Cited

U.S. PATENT DOCUMENTS

| | | | |
|---|---|---|---|
| 2,664,911 A * | 1/1954 | Thompson et al. ......... 137/205 |
| 2,757,686 A * | 8/1956 | Maxwell ..................... 137/574 |
| 3,115,894 A * | 12/1963 | Marx ........................ 137/576 |
| 4,789,170 A * | 12/1988 | Reber ........................ 280/838 |
| 4,830,056 A * | 5/1989 | Chamberlain ............ 137/899.4 |
| 4,951,704 A * | 8/1990 | Reber ........................ 137/351 |
| 5,917,139 A | 6/1999 | Goodell et al. |
| 6,053,533 A | 4/2000 | Osborn et al. |
| 6,074,462 A | 6/2000 | Quinn et al. |
| 6,082,408 A * | 7/2000 | Werling et al. .......... 137/899.4 |
| 6,347,678 B1 | 2/2002 | Osborn et al. |
| 6,391,098 B1 | 5/2002 | Thomas |
| 6,532,990 B1 | 3/2003 | Wood et al. |
| 6,532,991 B1 | 3/2003 | Wood et al. |
| 6,786,560 B1 * | 9/2004 | Heath ........................... 303/1 |
| 2003/0038535 A1 | 2/2003 | Tevis |

\* cited by examiner

*Primary Examiner*—A. Michael Chambers
(74) *Attorney, Agent, or Firm*—Calfee, Halter & Griswold LLP

(57) ABSTRACT

A module includes a reservoir having at least three chambers for storing compressed air for a vehicle air supply system, and a mounting assembly for supporting the reservoir on the vehicle. The chambers are separate from each other internally. The reservoir includes external connections, such as air lines or piping, for interconnecting the three chambers. The mounting assembly includes a bracket having a support surface. A bracket liner is received on the bracket between the support surface and the outer side surface of the reservoir. The reservoir may also include a purge chamber and an air dryer, as one unit, supported on the vehicle by the mounting assembly.

9 Claims, 7 Drawing Sheets

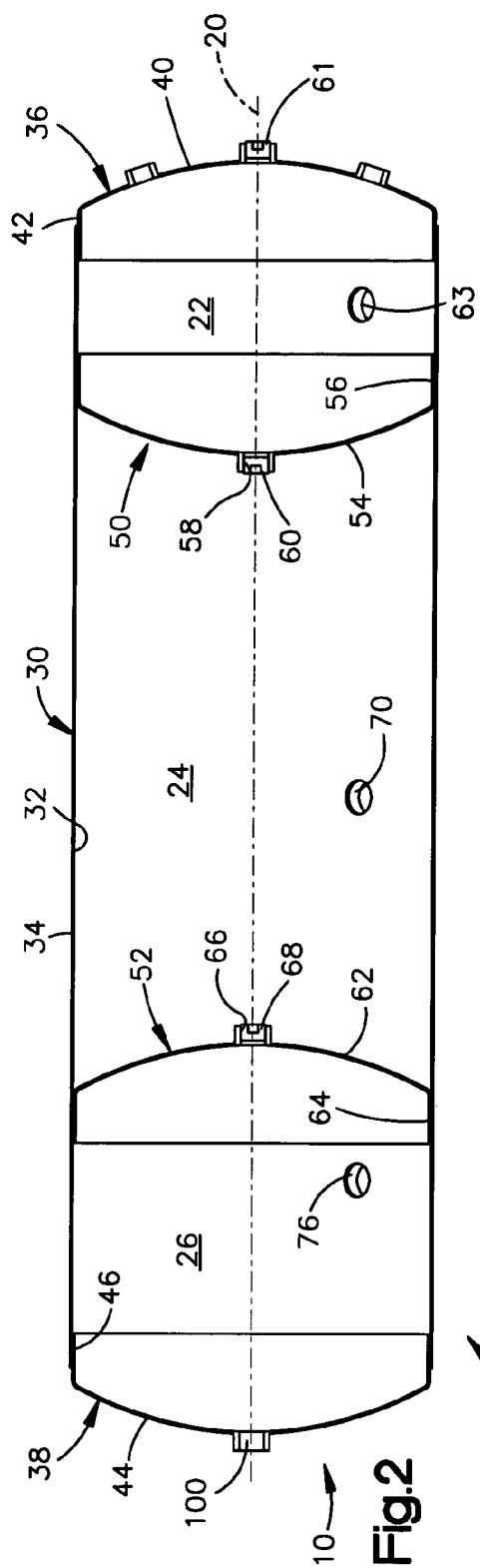
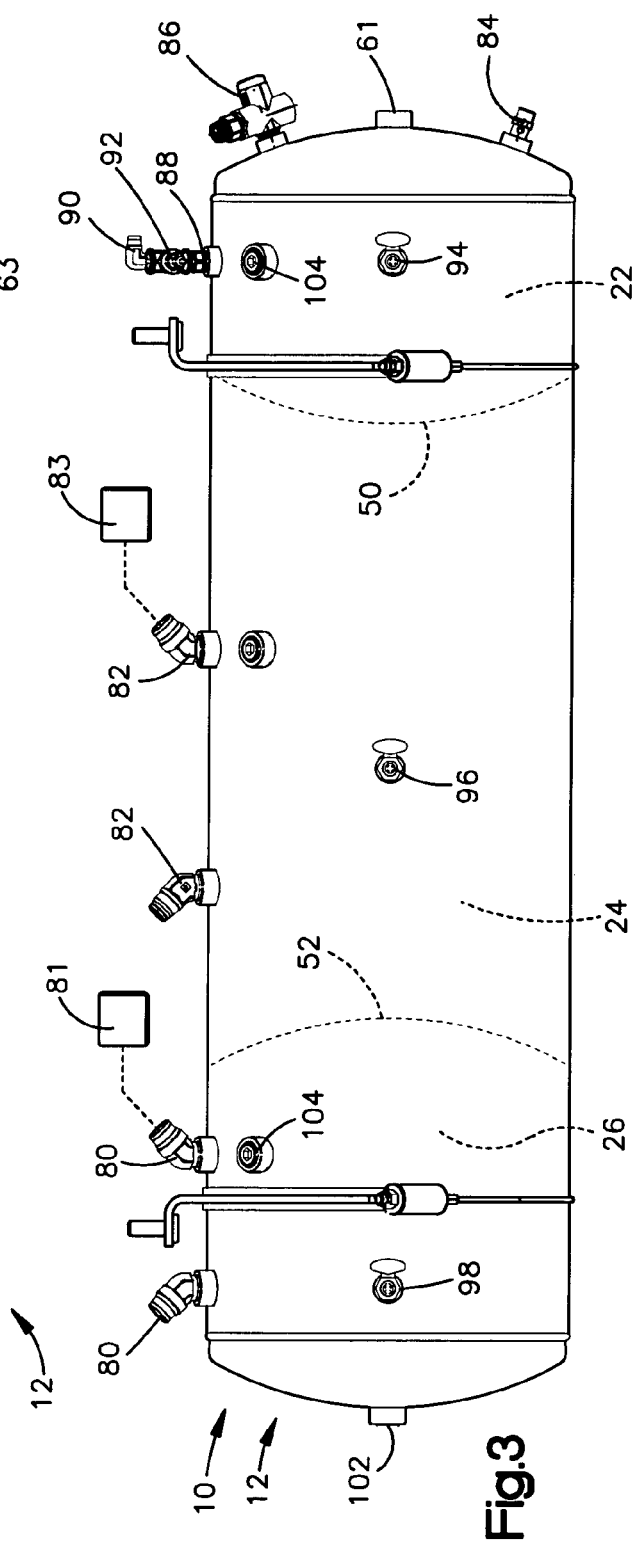

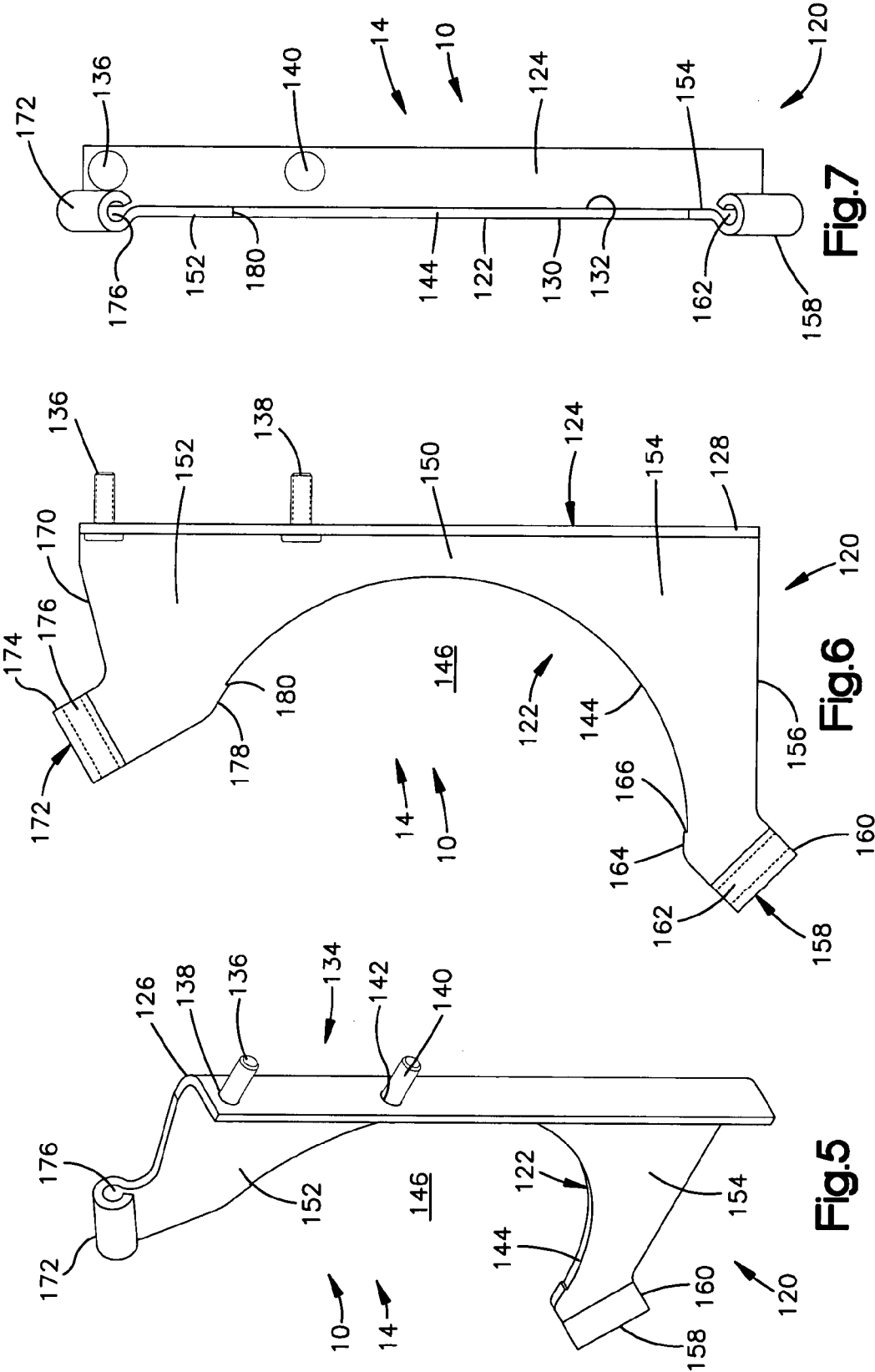

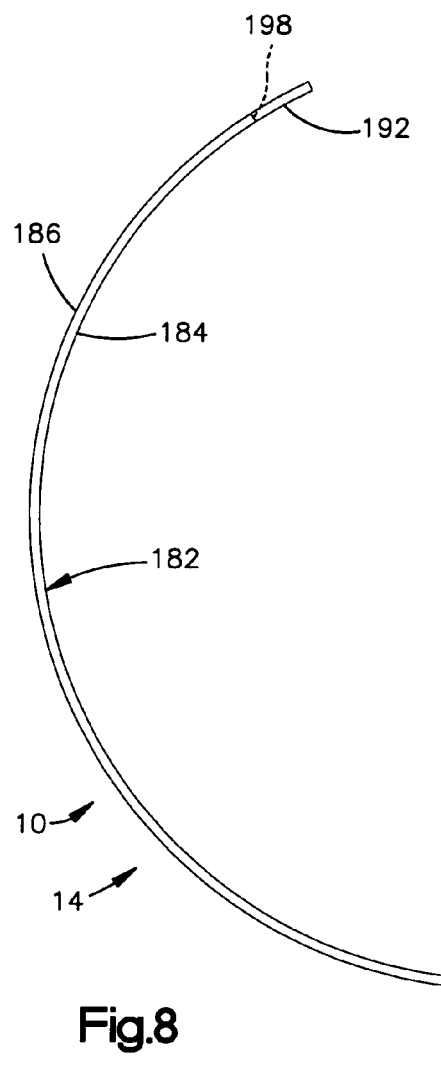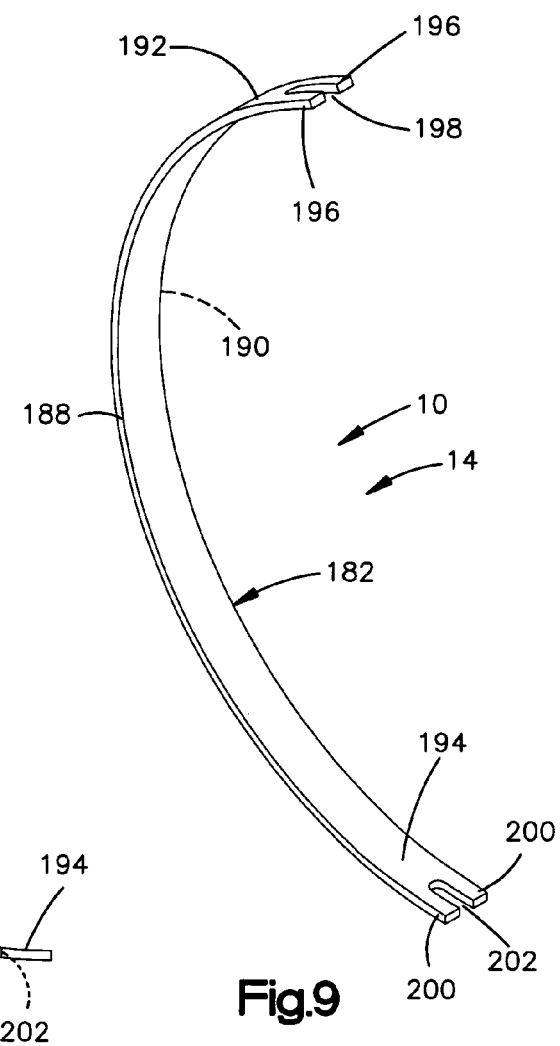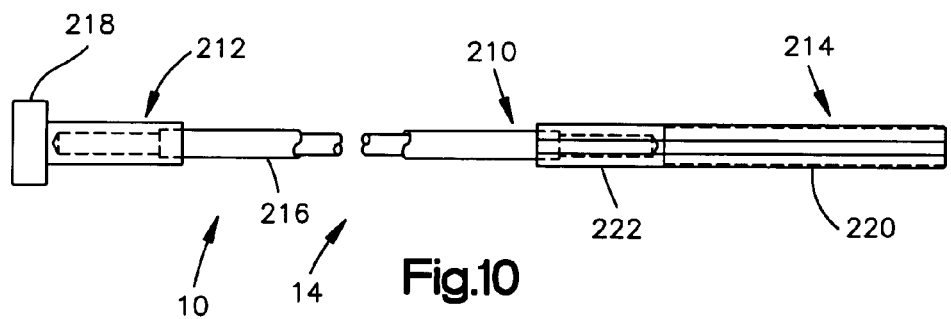

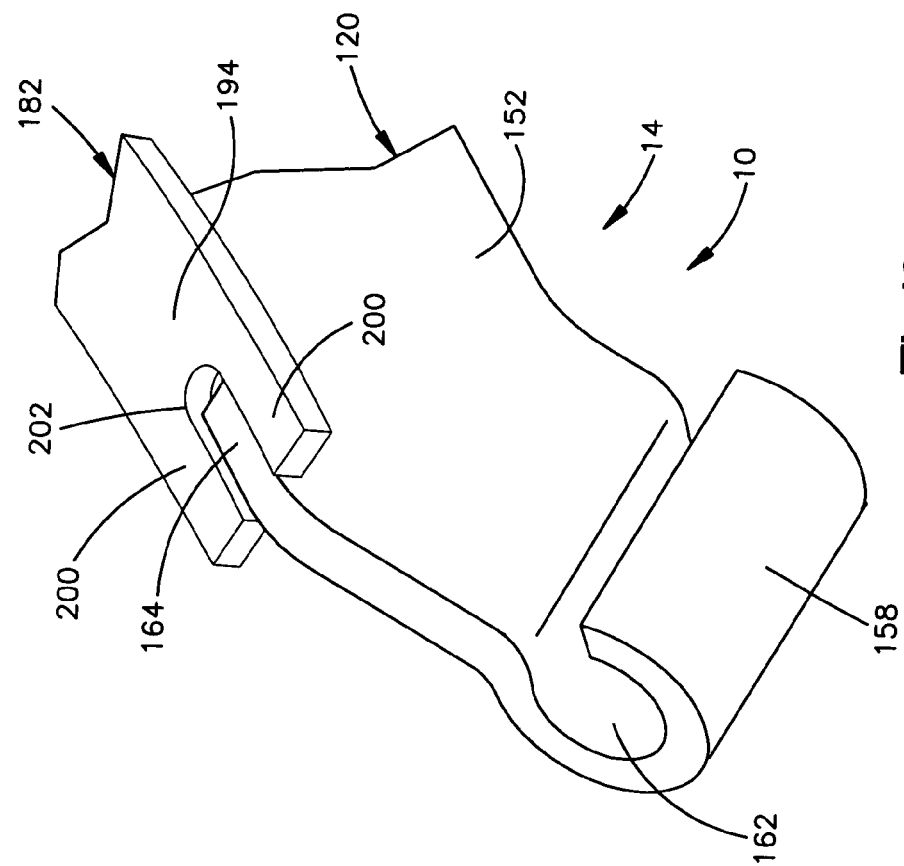
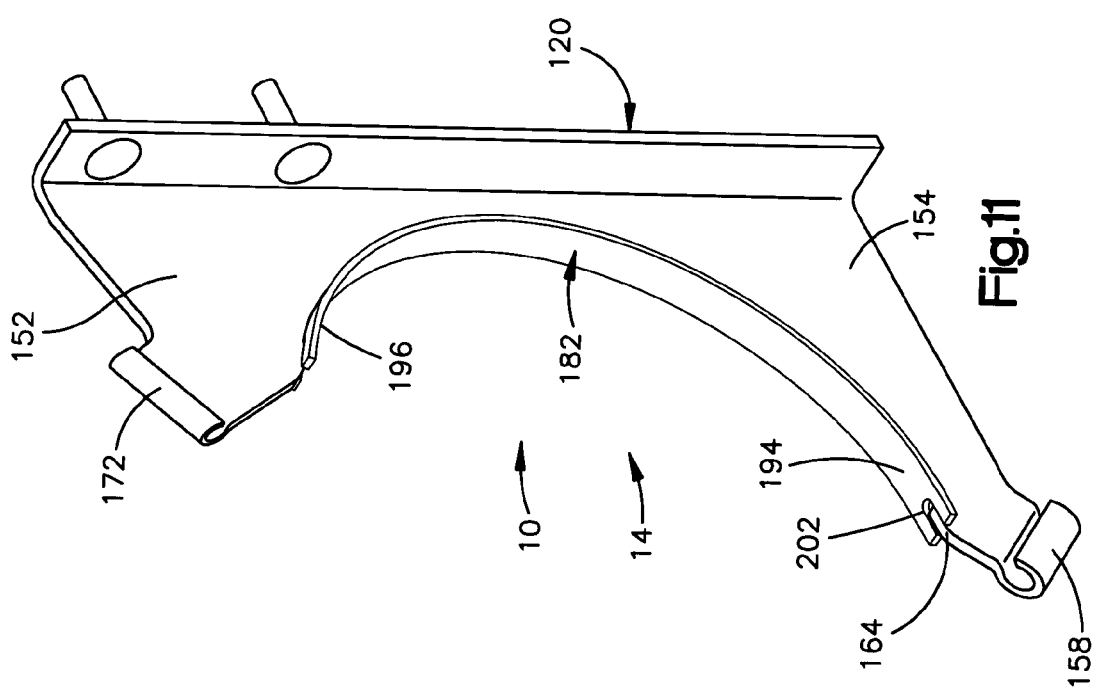
Fig.12
Fig.11

`US 7,117,896 B2`

AIR SYSTEM MODULE INCLUDING RESERVOIR AND MOUNTING STRUCTURE

BACKGROUND OF THE INVENTION

The present invention relates to an air supply system for a vehicle. In particular, the invention relates to a module including a reservoir and a mounting assembly for mounting the reservoir on a surface such as a portion of a frame of a vehicle.

Many vehicles, such as buses, trucks, and tractors, use compressed air for braking and other vehicle applications. The braking system on such vehicles typically includes several reservoirs, or tanks, for storing compressed air. The reservoirs are typically cylindrical in shape and mounted on a structural portion of the vehicle, for example, a portion of the frame such as a frame rail. The reservoirs must be supported firmly on the vehicle without moving relative to the support surface, to avoid damage to the fittings and air lines that are connected to the reservoirs. The air supply system also typically includes other items, such as an air dryer, connected with the reservoir by air lines. All these items are installed separately and interconnected when the vehicle is assembled.

SUMMARY OF THE INVENTION

One aspect of the invention relates to a reservoir for a vehicle air supply system. The reservoir includes at least three chambers that are separate from each other internally. The reservoir includes external connections, such as air lines or piping, for connecting the three chambers to each other.

Another aspect of the invention relates to a mounting assembly for a reservoir. In one embodiment, the mounting assembly includes a bracket having a support surface. A bracket liner is received on the bracket between the support surface and the outer side surface of the reservoir.

Another aspect of the invention is a module including two or more chambers that store all the compressed air needed for the entire braking system of the vehicle, fittings for distributing the compressed air to vehicle components, possibly an air dryer, and mounting structure for supporting the module on the vehicle in one installation step.

BRIEF DESCRIPTION OF THE DRAWINGS

The foregoing features of the present invention will become apparent to one skilled in the art to which the present invention relates upon consideration of the following description of the invention with reference to the accompanying drawings, in which

FIG. 2 is a sectional view of the reservoir of FIG. 1;

FIG. 3 is an elevational view of the reservoir of FIG. 1;

FIG. 5 is a perspective view of a bracket that forms part of the mounting assembly of FIG. 1;

FIG. 6 is a side elevational view of the bracket of FIG. 5;

FIG. 7 is a front elevational view of the bracket of FIG. 5;

FIG. 8 is a side elevational view of a bracket liner that forms part of the mounting assembly of FIG. 1;

FIG. 9 is a perspective view of the bracket liner of FIG. 8;

FIG. 10 is a schematic elevational view of a cable that forms part of the mounting assembly of FIG. 1;

FIG. 11 is a perspective view showing the bracket liner assembled on the bracket;

FIG. 12 is an enlarged view showing one end portion of the bracket liner as assembled on the bracket.

DETAILED DESCRIPTION OF THE INVENTION

Figure 1:
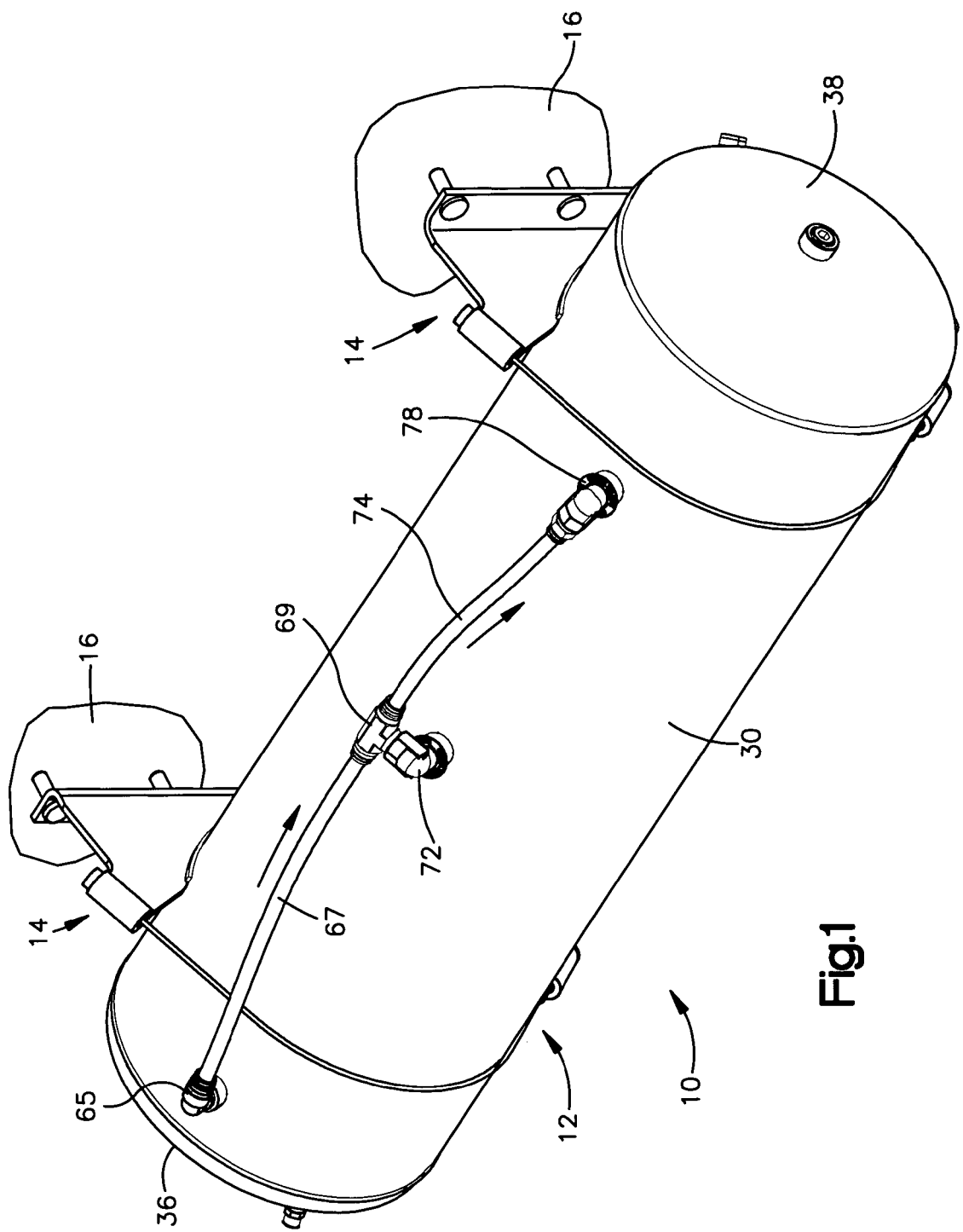
FIG. 1 is a perspective view of a module including a mounting assembly and reservoir in accordance with a first embodiment of the present invention.

The present invention relates to an air supply system for a vehicle. In particular, the invention relates to a module including a reservoir and a mounting assembly for mounting the reservoir on a surface such as a portion of a frame of a vehicle. The present invention is applicable to various module constructions. As representative of the invention, FIG. 1 illustrates a module 10 constructed in accordance with a first embodiment of the invention.

The module 10 includes a reservoir 12, which may be a reservoir that stores compressed air for use in a vehicle braking system, for example. The module 10 also includes two mounting assemblies 14. The two mounting assemblies 14 together support the reservoir 12 on a supporting structure, such as a frame portion of the vehicle, shown schematically and partially at 16. As illustrated, the two mounting assemblies 14 are mirror images of each other.

The reservoir 12 (FIG. 2) has a generally cylindrical configuration centered on an axis 20. The reservoir 12 as illustrated is an assembly of several pieces forming three chambers in the reservoir—a supply chamber 22, a second service chamber or secondary chamber 24, and a first service chamber or primary chamber 26. In other embodiments of the invention, the reservoir 12 could be made in another manner.

The reservoir 12 has a cylindrical main side wall 30 centered on the axis 20. The side wall 30 has parallel, cylindrical, inner and outer surfaces 32 and 34.

The reservoir 12 also includes first and second end pieces 36 and 38. The first end piece 36 has a bowl-shaped configuration including a convex end wall 40 and a cylindrical side wall 42 that is fitted and welded inside the main side wall 30. The second end piece 38 is similar to the first end piece 36. The second end piece 38 has a bowl shaped configuration including a convex end wall 44 and a cylindrical side wall 46 that is fitted inside the main side wall 30.

The reservoir 12 also includes first and second walls, or baffles, 50 and 52 inside the reservoir. The baffles 50 and 52 are illustrated as being separate pieces installed in the main side wall 30, but could be configured differently.

The first baffle 50 is similar in configuration to the first end piece. The first baffle 50 has a bowl-shaped configuration including an end wall 54 that is concave as facing the first end piece 36. The first baffle 50 also has a cylindrical side wall 56 that is fitted inside the main side wall 30. The first baffle 50 has a central opening 58 for allowing painting of the interior of the reservoir 12 during manufacture. The opening 58 is sealed with a plug 60 after manufacture to block flow of air through or past the first baffle 50. Thus, the first baffle 50 is imperforate.

The second baffle 52 is similar in configuration to the first baffle 50. The second baffle 52 has a bowl-shaped configuration including an end wall 62 that is concave as facing the second end piece 38. The second baffle 52 also has a cylindrical side wall 64 that is fitted inside the main side wall 30. The second baffle 52 has a central opening 66 for allowing painting of the interior of the reservoir 12 during manufacture. The opening 66 is sealed with a plug 68 after manufacture to block flow of air through or past the second baffle 52. Thus, the second baffle 52 is imperforate.

The first and second baffles 50 and 52 are fixed in position inside the reservoir main side wall 30, for example, by welding. When this is done, the three chambers 22, 24 and 26 of the reservoir 12 are formed. The supply chamber, or wet chamber, 22 extends between the first end piece 36 and the first baffle 50. The secondary chamber, or second chamber, 24 extends between the first baffle 50 and the second baffle 52. The primary chamber, or third chamber, 26 extends between the second baffle 52 and the second end piece 38. Because the baffles 50 and 52 are imperforate, there is no fluid communication between the three chambers 22, 24 and 26, internally of (within) the reservoir 12.

The reservoir 12 has a number of openings on the main side wall 30 and on the two end walls 40 and 44, and a number of fittings and plugs in those openings, as described below. The size, number, location and types of fittings and connections could be different as determined by the customer, or for a particular application or air system.

On the end wall 40 of the first end piece 36 is an inlet port 61. An inlet air line (not shown) can be connected with the inlet port 61 for receiving compressed air from the air dryer and compressor of the vehicle air system.

The main side wall 30 has an opening 63 at the location of the supply chamber 22. This opening 63 serves as an outlet to direct air from the supply chamber 22 to the secondary and primary chambers 24 and 26. In the illustrated embodiment, an elbow fitting 65 (FIG. 1) is located in the opening 63. Another type of fitting can be used, if desired. Also, a second fitting can be located on the supply chamber 22, for example at the opening 63, for directing air from the supply chamber to an accessory system of the vehicle.

An air line 67 is connected with the elbow fitting 65. The air line 67 is located outside of the main side wall 30 of the reservoir 12 and thus external to (not within, but outside of) the three chambers 22–26. The air line 67 may be a pipe, tubing, a hose, or another structure. A tee connector 69 is located on the other end of the air line 67.

The main side wall 30 (FIG. 2) has an opening 70 at the location of the secondary chamber 24. This opening 70 serves as an inlet for receiving air from the supply chamber 22 and directing it into the secondary chamber 24. In the illustrated embodiment, a check valve 72 is located in the opening 70. Another type of fitting can be used, if desired.

The check valve 72 is connected with the tee 69 on the end of the air line 67. As a result, air can flow from the supply chamber 22, through the air line 67 and the tee 69 and the check valve 72, into the secondary chamber 24, through the opening 70. Because the check valve 72 is a one way valve, air can not flow out of the secondary chamber 24 through the check valve and back into the supply chamber 22 or into the primary chamber 26.

A second external air line 74 is connected with the third side of the tee 69. The air line 74 is located outside of the main side wall 30 of the reservoir 12 and thus external to (not within, but outside of) the three chambers 22–26.

The main side wall 30 has an opening 76 at the location of the primary chamber 26. This opening 76 serves as an inlet for receiving air from the supply chamber 22 and directing it into the primary chamber 26. In the illustrated embodiment, a check valve 78 is located in the opening 76. Another type of fitting can be used, if desired.

The check valve 78 is connected with the second external air line 74. As a result, air can flow from the supply chamber 22, through the first air line 67 and the tee 69 and the second air line 74 and the check valve 78, into the primary chamber 26 through the opening 76. Because the check valve 78 is a one way valve, air can not flow out of the primary chamber 26 through the check valve and back into the supply chamber 22 (or into the secondary chamber 24).

Two outlet fittings 80 are provided from the primary chamber 26. The fittings 80 supply compressed air from the primary chamber 26 to the primary portion of the braking system, including one or more brake chambers indicated schematically at 81 for controlling braking of vehicle wheels. Two outlet fittings 82 are provided from the secondary chamber 24. The fittings 82 supply compressed air from the secondary chamber 24 to the secondary portion of the braking system including one or more brake chambers indicated schematically at 83 for controlling braking of vehicle wheels.

Fitted on the end wall 40 of the first end piece 36 is a pressure relief valve, or safety valve, 84. The pressure relief valve 84 automatically vents the supply chamber 22 if pressure in the supply chamber exceeds a predetermined amount, for example, 150 psi. The pressure relief valve 84 closes thereafter when the pressure drops below the predetermined level.

Also fitted on the end wall 40 of the first end piece 36 is a pressure protection valve 86. The pressure protection valve 86 is operative to supply another part (not shown) of the vehicle air system, such as an accessory. The pressure protection valve 86 opens, to allow compressed air to flow from the supply chamber 22 to the other part of the vehicle air system, only when pressure in the supply chamber exceeds a predetermined amount, for example, 75 psi.

Fitted on the main side wall 30 of the reservoir 12, in fluid communication with the supply chamber 22, is a fitting assembly 88. The fitting assembly 88 includes a remote fill valve 92 and an outlet fitting 90. The remote fill valve 92 enables compressed air to be directed into the supply chamber 22 from a remote location, for example, when the reservoir 12 is being serviced in a shop. The outlet fitting 90 provides pressure to a governor for the air compressor of the system, specifically, the amount of pressure in the supply chamber 22.

Three drain cocks 94, 96 and 98 are provided for draining water and other impurities from the three chambers 22–26. The drain cocks 96–98 are located in the main side wall 30. One drain cock 94 is connected with and drains the supply chamber 22; another drain cock 96 is connected with and drains the secondary chamber 24; and the third drain cock 98 is connected with and drains the primary chamber 26.

The end wall 44 of the second end piece 38 has a central opening 100 for allowing painting of the interior of the reservoir 12 during manufacture. The opening 100 is sealed with a plug 102 after manufacture to block flow of air through the end wall 44 of the second end piece 38. In addition, on the reservoir 12 a plurality of spare openings with plugs 104 are preferably provided, at least one in each chamber 22–26, for additional access to the chambers, as desired or determined by the customer.

When the module 10 is being charged, compressed air from the compressor or air dryer flows into the reservoir 12 through the inlet port 61. The compressed air fills the supply chamber 22. The compressed air also flows out of the supply chamber 22 through the elbow fitting 65, through the first air line 67 and the check valve 72, and into the second service chamber or secondary chamber 24. At the same time, the compressed air from the supply chamber 22 flows through the second air line 74 and the second check valve 78 into the first service chamber or primary chamber 26.

When the chambers 22–26 are filled to the desired pressure, the compressor turns off. Compressed air can be withdrawn from the service chambers 24 and 26 as required by the vehicle air system components, such as vehicle brake actuators, through the outlets 80 and 82. The two service chambers 24 and 26, together with the supply chamber 22, are sufficient to supply compressed air for the entire braking system of the vehicle. Accessories and other components can be supplied off the pressure protection valve 86. No other reservoirs are needed in the system. Thus, all the reservoirs for the air system of the vehicle are contained within the module 10, which is supported as one piece by its mounting assemblies 14.

Figure 4:
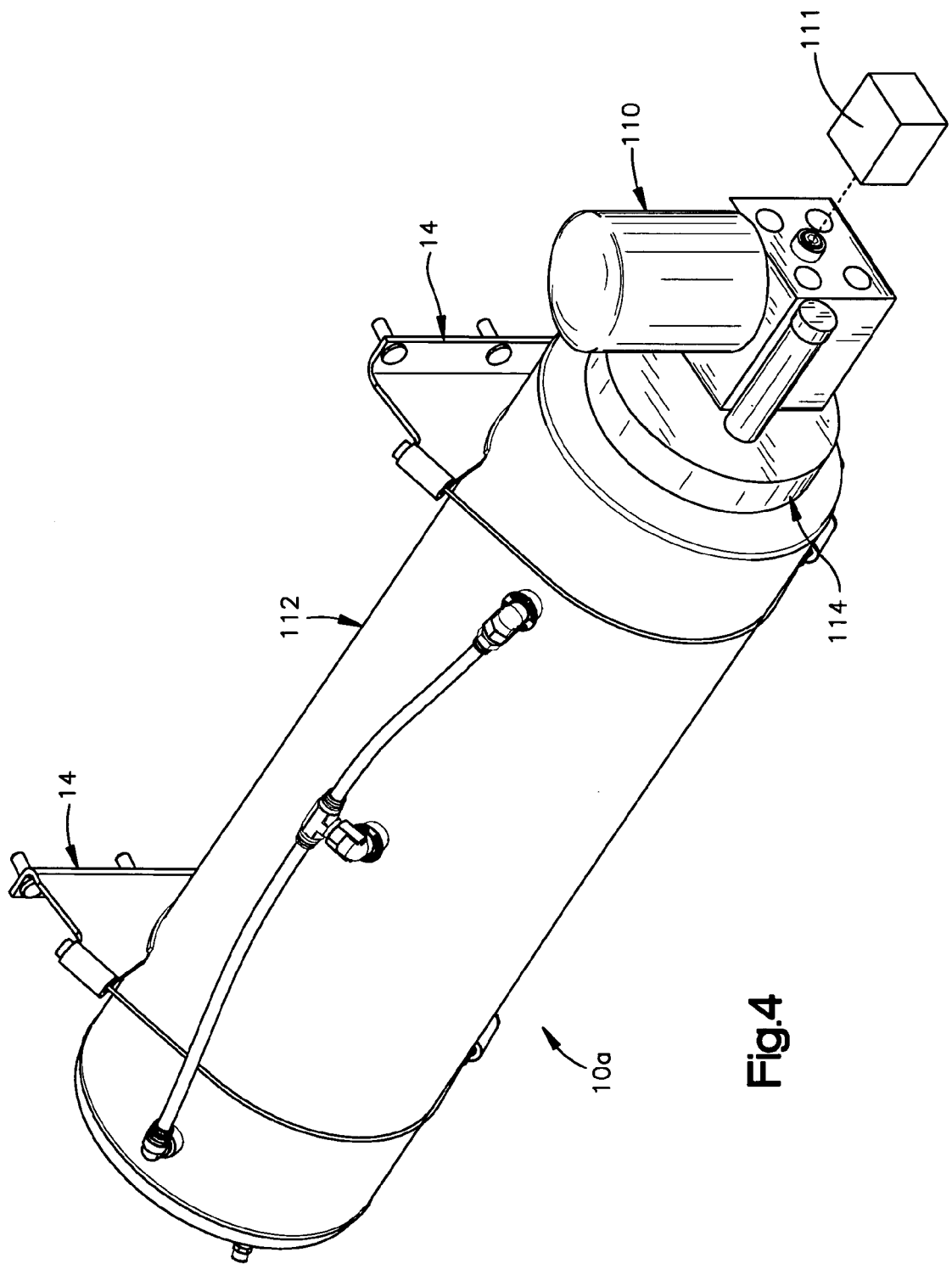
FIG. 4 is a view similar to FIG. 1 of a module including a mounting assembly and reservoir and air dryer in accordance with a second embodiment of the present invention.

FIG. 4 illustrates a further embodiment of a module 10a in accordance with the present invention. The module 10a includes an air dryer 110, and a reservoir 112. The air dryer receives compressed air from a compressor indicated schematically at 111. The reservoir 112 includes a purge volume 114. The reservoir 112 also includes all the service chambers needed for the braking system of the vehicle, as well as a supply chamber if required.

The air dryer 110 supplies dry, compressed air to the chambers of the reservoir 112, externally, possibly also with an internal pipe extending through the purge volume 114. The connection between the air dryer 110 and the purge volume 114 is internal. The module 10a thus includes all the major components of a vehicle air supply system other than the compressor—air dryer, purge volume, supply volume (if necessary), and service chambers—supported as one piece with its mounting assemblies 14.

Each one of the mounting assemblies 14 (FIGS. 5–12) includes a bracket 120. The bracket 120 is preferably formed from sheet metal in a manner as described below. The sheet metal may be, for example, one-quarter inch thick sheet steel.

The bracket 120 includes a main body portion 122 and a mounting flange 124 that extend at right angles to each other from a common edge 126. The mounting flange 124 has a planar configuration including an edge surface 128. The main body portion 120 is planar and has first and second opposite major side surfaces 130 and 132.

The bracket 120 includes structure 134 (FIG. 5) for supporting the mounting flange 124 and, thereby, the bracket as a whole, on a supporting structure 16, such as a vehicle frame. In the illustrated embodiment, the structure 134 includes an upper mounting stud 136 that is press fit in an upper stud opening 138 formed in the mounting flange 124. The structure 134 also includes a lower mounting stud 140 that is press fit in a lower stud opening 142 formed in the mounting flange 124. Other types of fasteners could be used, and other ways of connecting the fasteners with the mounting flange 124 could be used.

The main body portion 122 has an arcuate edge surface 144 that defines a circular cutout 146 in the bracket 120. The edge surface 144 serves as a support surface for the reservoir 12, as described below. The edge surface 144 has a radius of curvature that is slightly larger than the radius of curvature of the outer surface 34 of the main side wall 30 of the reservoir 12.

The presence of the cutout 146 provides the main body portion 122 with a generally C-shaped configuration including a narrow central portion 150 between upper and lower arms 152 and 154. The lower arm 154 of the mounting bracket 120 is partially defined by a lower edge surface 156 of the bracket that extends generally normal to the mounting flange 124.

The lower arm 154 includes at its outer end a cable channel 158. The cable channel 158 as illustrated is a rolled end portion of the bracket arm 154, but could be formed in another manner, for example, by welding of a separate tube section. The cable channel 158 has a cylindrical, tube-shaped configuration and extends out of the plane of the main body portion.

The cable channel 158 has a lower end face 160. The cable channel 158 has a central opening or passage 162 that extends at about a forty-five degree angle to the edge 126 between the main body portion 122 and the mounting flange 124. The passage 162 extends upward as it extends away from the mounting flange 124, that is, away from the lower end face 160 of the cable channel 158.

The lower arm 154 of the bracket 120 also includes a shoulder 164. The shoulder 164 is a portion of the lower arm 154 having a shoulder surface 166 that is presented toward and extends perpendicular to the arcuate edge surface 144. The shoulder 164 defines the lower end of the arcuate edge surface 144. The arcuate edge surface 144 is recessed slightly below the shoulder 164.

The upper arm 152 of the mounting bracket 120 is partially defined by an upper edge surface 170 of the bracket that extends at an angle to the mounting flange 124. The upper arm 152 includes at its outer end a cable channel 172. The cable channel 172 as illustrated is a rolled end portion of the bracket arm 152, but could be formed in another manner, for example, by welding of a separate tube section. The cable channel 172 has a cylindrical, tube-shaped configuration and extends out of the plane of the main body portion 122.

The cable channel 172 has an upper end face 174. The cable channel 172 has a central opening or passage 176 that extends at an angle to the mounting flange 124. The passage 176 extends downward as it extends away from the mounting flange 124, that is, away from the upper end face 174.

The upper arm 152 of the bracket 120 also includes a shoulder 178. The shoulder 178 is a portion of the upper arm 152 having a shoulder surface 180 that is presented toward and extends perpendicular to the arcuate edge surface 144 of the bracket 120. The shoulder 178 defines the upper end of the arcuate edge surface 144. The arcuate edge surface 144 is recessed slightly below the shoulder 178.

Each mounting assembly 14 also includes a bracket liner 182, associated in a one-to-one relationship with one of the brackets 120. The bracket liner 182 is designed to fit into the cutout 146 in the bracket 120, between the shoulder surfaces 166 and 180, overlying the arcuate edge surface 144 of the bracket.

The bracket liner 182 as illustrated is a single piece of metal with a strap-like configuration. The bracket liner 182 may be made from the same material as the bracket 120, or from a different material. The bracket liner 182 is thin enough to be flexible as it is fitted into the cutout 146 in the bracket 120. A preferred thickness for the bracket liner 182 is one eighth of an inch, when the bracket 120 is one quarter of an inch thick. The bracket liner 182 has to be thick enough so that, when it is installed on the bracket 120, the reservoir 12 contacts only the bracket liner and not any of the portions of the bracket.

The bracket liner 182 has inner and outer major side surfaces 184 and 186 and first and second edge surfaces 188 and 190. The bracket liner 182 is wider (between its edge surfaces 188 and 190) than the arcuate edge surface 144 of the bracket 120. A preferred width for the bracket liner 182 is three-quarters of an inch, if the bracket 180 itself is made from one-quarter inch stock. The bracket liner 182 should be wide enough so that slots can be formed in its ends, as described below, and still leave sufficient material on either side of the slots. The bracket liner 182 also has to be narrow enough to fit between ferrules or other fittings on the reservoir 12.

The bracket liner 182 has upper and lower end portions 192 and 194 that may be identical to each other in configuration. The upper end portion 192 has a forked configuration including two arms 196 that extend on opposite sides of a notch or slot 198. The lower end portion 194 has a forked configuration including two arms 200 that extend on opposite sides of a notch or slot 202.

The bracket liner 182 is not planar but in a free state preferably has a curved, three-dimensional configuration that is slightly flatter (larger in radius of curvature) than the arcuate edge surface 144 of the bracket 120. This configuration can be obtained by rolling the bracket liner 182 after it is stamped to the illustrated configuration, in a manner as described below.

Each mounting assembly 14 also includes a securing member 210 for securing the reservoir 12 on the brackets 120. The securing member 210 in the illustrated embodiment is a cable preferably made from wound, galvanized steel wire coated with polyethylene. The cable 210 has first and second opposite end portions 212 and 214 and an intermediate or central portion 216. The securing member 210 could, alternatively, have a different configuration, such as a strap or a fixed-configuration member such as a U-bolt.

The first end portion, or upper end portion, 212 of the cable 210 includes a button 218 staked to one end of the central section 216. The second end portion, or lower end portion, 214 of the cable 210 includes an externally threaded stud 220 that is staked to the other end of the central portion 216. The second end portion 214 also includes a clamping section 222, inward of the stud 220, that has wrenching flats.

The bracket 120 may be formed in the following manner. The bracket 120 is preferably made from hot rolled steel that is blanked then formed. A portion that matches the contour of the reservoir 12 to be supported is cut out of the material during the blanking operation, preferably by laser cutting, to form the arcuate edge surface 144. Also formed during the blanking process are the two shoulders 164 and 178, the shoulder surfaces 166 and 180, and the two mounting stud openings 138 and 142.

A ninety-degree bend is formed in the material to delineate the mounting flange 124 from the main body portion 122. The two end portions of the blank are rolled to form the cable channels 158 and 172. The two mounting studs 136 and 140 are pressed into the mounting stud openings 138 and 142.

The bracket liner 182 may be formed in the following manner. The bracket liner 182 is preferably made from carbon steel strip. The two slots 198 and 202 are formed in the end portions 192 and 194 of the bracket liner 182. The liner 182 is then rolled so that when in a free state it has a curved, three-dimensional configuration that conforms generally to the contour of the reservoir 12 and to the contour of the arcuate edge surface 144 of the bracket 120.

The bracket liner 182 is assembled to the bracket 120 by placing one end portion of the bracket liner (for example, the lower end portion 194) on the bracket so that the slot 202 in the end portion receives the shoulder 164 on the bracket. The bracket liner 182 is then drawn back into the cutout 146 in the bracket 120, for example, by rolling it onto the bracket along the arcuate edge surface 144 of the bracket.

As the bracket liner 182 is drawn back onto the bracket 120, the slot 198 at the other end portion 192 of the bracket liner slips over the other shoulder 178 on the bracket and audibly snaps into engagement with the shoulder. The engagement of the liner end portions 194 and 192 with the shoulders 164 and 178, and the curved configuration of the liner 182, hold the liner in place on the bracket 120 without fasteners. Also, because the bracket liner 182 is formed to a slightly flatter shape than the edge surface 144 of the bracket 120, the bracket liner tends to try to resume its shape, thus pressing against the edge surface 144, further increasing the force holding itself on the bracket. The bracket liner 182 is self-supporting on the bracket 120.

The thickness of the bracket liner 182 is selected so that it extends radially inward (toward the reservoir 12) past the shoulder surfaces 166 and 180 on the bracket upper and lower arms. When the bracket liner 182 is assembled on the bracket 120, the inner major side surface 184 of the bracket liner has a radius of curvature that is substantially equal to the radius of curvature of the outer side surface 34 of the main side wall 30 of the reservoir 12.

The reservoir 12 is placed on the assembled bracket 120 and bracket liner 182 of the mounting assembly 14. The reservoir 12 does not engage or rest on the bracket 120 itself. Instead, the reservoir 12 engages and rests on the bracket liner 182, because the bracket liner extends inward past the shoulder surfaces 166 and 180 on the upper and lower arms of the bracket 120. The same assembly process occurs with the other mounting assembly 14 of the module 10. All this assembly is preferably done before the module is shipped to the customer.

The bracket liner 182, which is wider than the edge surface 144 of the bracket 120, protects the reservoir 12 from contact with the sharp-cornered and narrow edge surface 144 of the bracket. The force (load) between the reservoir 12 and the bracket 120 is spread over the relatively wide inner major side surface 184 of the bracket liner 182, rather than over the relatively narrow edge surface 144 of the bracket. As a result, the unit loading (force per unit area) on the side wall 30 of the reservoir 12 is reduced. Also, the reservoir 12 does not contact the sharp corners of the edge surface 144. This can prevent the bracket mounting assembly 14 from wearing into or otherwise damaging the material of the reservoir side wall 30, for example, under vibration experienced as the vehicle operates.

The cable 210 is installed by inserting the second end portion 214 of the cable through the upper cable channel 172 and then the lower cable channel 158. The button 218 on the first end portion 212 of the cable 210 is drawn tight against the upper end face 174 of the upper cable channel 172. When this is done, the cable 210 extends around the reservoir 12, and the externally threaded portion 220 of the cable projects from the lower cable channel 158.

Figure 13:
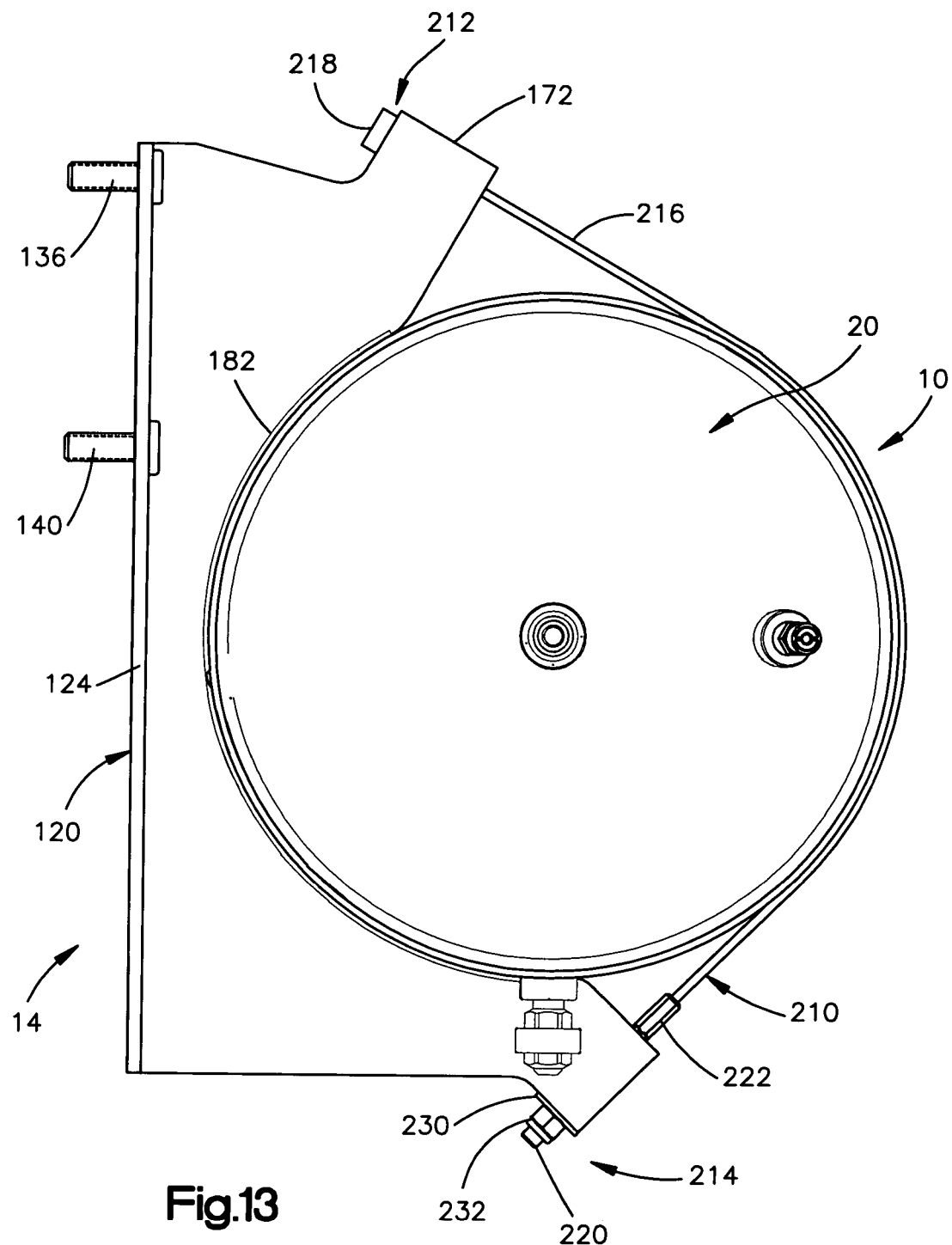
FIG. 13 is an elevational view showing the mounting assembly supporting the reservoir.

A washer 230 and a lock nut 232 (FIG. 13) are assembled onto the threaded stud 220. As the nut 232 is turned, the washer 230 and the nut are brought to bear against the lower end face 160 of the lower cable channel 158. The clamping portion 222 of the lower end portion 214 of the cable 210 is held or clamped to resist rotation of the cable.

Continued tightening of the lock nut 232 on the stud 220 draws the cable 210 tighter and draws the reservoir 12 tightly against the inner major side surface 184 of the bracket liner 182. The reservoir 12 is clamped to the bracket 120 via the bracket liner 182 and, thereby, to the mounting assembly 14 (the two mounting assemblies, as two are typically used).

The mounting assemblies 14, the reservoir 12, and its fittings, together form the module 10 depicted in FIG. 1. The module 10 provides mounting, storage, and distribution, in one convenient package that can be assembled and then shipped to the customer. The module 10 is available to mount as one completed unit to a suitable vehicle supporting structure 16 via a minimum of fasteners. This reduces assembly time tremendously for the customer and also increases ease of assembly. It should be understood that this aspect of the invention is applicable to modules including reservoirs having one or more chambers, and preferably two or more chambers, thus not being limited to a three-chambered reservoir as is illustrated. It should also be understood that the present invention is applicable to modules including reservoirs (of one, two, three or more chambers) that are not necessarily used in an air braking system but that can be used for example in supplying accessory air-driven systems or components on a hydraulic-braked vehicle.

When the mounting assembly 14 is mounted on a supporting structure 16, the reservoir 12, all the fittings, the external air lines, etc. are thereby supported on the supporting structure. The fittings can be custom made and even oriented so that the customer need only plug in the air lines going to other components of the vehicle.

The module 10a of FIG. 4 is composed of one or more mounting assemblies 14, a reservoir 12, and air dyer with governor 110, and fittings. The module 10a provides air mounting, treatment (if air dryer is included), storage, and distribution, in one convenient package that can be mounted to a suitable vehicle supporting structure 16 via a minimum of fasteners.

From the above description of the invention, those skilled in the art will perceive improvements, changes, and modifications in the invention. Such improvements, changes, and modifications within the skill of the art are intended to be included within the scope of the appended claims.

The invention claimed is:

1. An air supply module for use in a vehicle air system, said module including:
    a reservoir having at least three chambers that are separated internally by a plurality of imperforate baffles; and
    a mounting system on the reservoir for installing and supporting the reservoir on the vehicle;
    wherein said at least three chambers include a primary service reservoir for supplying compressed air to a primary side of a braking system of the vehicle and a secondary service reservoir for supplying compressed air to a secondary side of the braking system of the vehicle, and said at least three chambers of said reservoir are sufficient to supply all the air needed by the components of the vehicle air system.

2. A module as set forth in claim 1 wherein said reservoir further includes a purge volume and an air dryer.

3. An air supply module for use in a vehicle air system, said module including:
    a reservoir having at least three chambers that are separated internally by a plurality of imperforate baffles; and
    a mounting system on the reservoir for installing and supporting the reservoir on the vehicle;
    further including at least one air line supported on the outside of said reservoir for directing compressed air between said first chamber and said second chamber and said third chamber.

4. A module as set forth in claim 3 wherein said mounting assembly comprises a bracket having a support surface, and a bracket liner received on said bracket between said support surface and the outer side surface of the reservoir.

5. A module as set forth in claim 4 wherein said bracket liner has end portions that engage said bracket and hold said bracket liner on said bracket without fasteners.

6. A module for use in a vehicle air supply system, said module including:
    a reservoir having at least three chambers; and
    a mounting assembly for supporting the reservoir on the vehicle, said mounting assembly comprising a bracket having a support surface and a bracket liner received on said bracket between said support surface and the outer side surface of the reservoir;
    wherein said bracket liner has end portions that engage said bracket and hold said bracket liner on said bracket without fasteners.

7. A module for use in a vehicle air supply system, said module including:
    a reservoir having at least three chambers; and
    a mounting assembly for supporting the reservoir on the vehicle, said mounting assembly comprising a bracket having a support surface and a bracket liner received on said bracket between said support surface and the outer side surface of the reservoir;
    wherein said support surface of said bracket is a curved edge surface and said bracket liner is wider than said edge surface, said bracket liner has end portions for engaging said bracket and holding said bracket liner on said bracket, said bracket liner when in a free state has a curved, three-dimensional configuration and the engagement of said liner end portions with said bracket and said curved, three-dimensional configuration of said liner hold said liner in place on said bracket without fasteners.

8. Apparatus as set forth in claim 7 wherein said bracket liner when in its free condition is slightly flatter than said arcuate edge surface and when assembled on said bracket attempts to regain its free condition thereby pressing against said edge surface to help hold said liner in place on said bracket.

9. A module for use in a vehicle air supply system, said module including:
    a reservoir having at least three chambers; and
    a mounting assembly for supporting the reservoir on the vehicle, said mounting assembly comprising a bracket having a support surface and a bracket liner received on said bracket between said support surface and the outer side surface of the reservoir;
    further including at least one air line supported on the outside of said reservoir for directing compressed air between said first chamber and said second chamber and said third chamber.

* * * * *